United States Patent
Ahn et al.

(10) Patent No.: US 9,340,637 B2
(45) Date of Patent: May 17, 2016

(54) ASA GRAFT COPOLYMER HAVING SUPERIOR SHOCK RESISTANCE, WEATHER RESISTANCE, COLORING PROPERTIES, AND METHOD FOR MANUFACTURING SAME

(71) Applicant: Cheil Industries Inc., Gumi-si (KR)

(72) Inventors: Jun Hwan Ahn, Uiwang-si (KR); Sung Il Myung, Uiwang-si (KR); Il Jin Kim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/369,016

(22) PCT Filed: Dec. 13, 2012

(86) PCT No.: PCT/KR2012/010833
§ 371 (c)(1),
(2) Date: Jun. 26, 2014

(87) PCT Pub. No.: WO2013/100448
PCT Pub. Date: Jul. 4, 2013

(65) Prior Publication Data
US 2015/0011709 A1 Jan. 8, 2015

(30) Foreign Application Priority Data

Dec. 30, 2011 (KR) .................. 10-2011-0147008
Dec. 30, 2011 (KR) .................. 10-2011-0147289

(51) Int. Cl.
| | |
|---|---|
| *C08F 265/04* | (2006.01) |
| *C08L 25/12* | (2006.01) |
| *C08L 33/20* | (2006.01) |
| *C08F 285/00* | (2006.01) |

(52) U.S. Cl.
CPC ............ *C08F 265/04* (2013.01); *C08F 285/00* (2013.01); *C08L 25/12* (2013.01); *C08L 33/20* (2013.01); *C08L 2207/53* (2013.01)

(58) Field of Classification Search
CPC ........ C08F 2/24; C08F 265/04; C08F 285/00; C08L 25/12; C08L 33/20; C08L 51/003; C08L 51/04
See application file for complete search history.

(56) References Cited

U.S. PATENT DOCUMENTS

| 7,173,082 B2 | 2/2007 | Ahn et al. | |
|---|---|---|---|
| 8,367,770 B2 | 2/2013 | Ha et al. | |
| 2005/0119393 A1* | 6/2005 | Ahn et al. | ............... 524/460 |
| 2007/0287799 A1* | 12/2007 | Ha et al. | ............... 525/71 |

FOREIGN PATENT DOCUMENTS

| KR | 10-2000-0014174 A | 3/2000 |
|---|---|---|
| KR | 10-2003-0064114 A | 7/2003 |
| KR | 10-0450230 B1 | 9/2004 |
| KR | 10-2007-0117315 A | 12/2007 |
| KR | 10-0987957 B1 | 10/2010 |
| WO | 2013/100448 A1 | 7/2013 |

OTHER PUBLICATIONS

International Search Report in counterpart International Application No. PCT/KR2012/010833 dated Mar. 20, 2013, pp. 1-4.

* cited by examiner

*Primary Examiner* — Irina S Zemel
*Assistant Examiner* — Jeffrey Lenihan
(74) *Attorney, Agent, or Firm* — Additon, Higgins & Pendleton, P.A.

(57) ABSTRACT

The present invention relates to an acrylonitrile-styrene-acrylate (ASA) graft copolymer having a core-shell structure, and a method for manufacturing the same, wherein the core of the ASA graft copolymer is a multi-core rubber copolymer in which alkyl acrylate monomers are sequentially polymerized, and the shell is formed by graft-polymerizing a styrene-based monomer and an acrylonitrile-based monomer with the core. The ASA graft copolymer resin is manufactured by the steps of manufacturing the multi-core rubber polymer latex by sequentially polymerizing the alkyl acrylate monomers; and forming a shell layer by graft-polymerizing the styrene-based monomer and the acrylonitrile-based monomer with the multi-core rubber polymer. The ASA resin composition according to the present invention has excellent impact resistance, weather resistance, and dyeability properties.

18 Claims, No Drawings

ASA GRAFT COPOLYMER HAVING SUPERIOR SHOCK RESISTANCE, WEATHER RESISTANCE, COLORING PROPERTIES, AND METHOD FOR MANUFACTURING SAME

CROSS-REFERENCE TO RELATED APPLICATIONS

This application claims priority to and the benefit of International Application No. PCT/KR2012/010833, filed Dec. 13, 2012, which published as WO 2013/100448 on Jul. 4, 2013, and Korean Patent Application No. 10-2011-0147289, filed in the Korean Intellectual Property Office on Dec. 30, 2011, and Korean Patent Application No. 10-2011-0147008, filed in the Korean Intellectual Property Office on Dec. 30, 2011, the entire disclosure of each of which is incorporated herein by reference.

FIELD OF THE INVENTION

The present invention relates to an ASA graft copolymer and a method for preparing the same, and relates to an ASA graft copolymer having excellent impact resistance, weather resistance, and dyeability property and method for preparing the same.

BACKGROUND OF THE INVENTION

Generally, an acrylonitrile-butadiene-styrene resin (hereinafter, ABS resin) has excellent impact resistance, mechanical strength, surface gloss, and processability, so it has been used in wide range of electric/electronic products, vehicle parts, general goods, and the like. However, since the ABS resin includes chemically unstable double bonds in the rubber component which can be easily aged by ultraviolet rays, the ABS resin has inferior weather resistance and light resistance. The ABS resin has drastic discoloration and reduction of physical properties when being left outside for a long period of time, so it is not suitable for outdoor applications which are exposed to sunlight. In order to compensate the above drawbacks, post-processes such as coating or plating are applied to ABS resin molded articles, or large amount of ultraviolet stabilizer is added to the ABS resin when the ABS resin is being extruded. However, the former has complicated processes and high failure rates, and the later has insufficient long-lasting weather resistance and expensive manufacturing costs.

In order to overcome the application limits of the ABS resin, several resins having excellent weather resistance are used instead of the ABS resin and acrylate-styrene-acrylonitrile resin (hereinafter, ASA resin) is widely used among them.

The ASA resin is generally manufactured by mixing and extruding an acrylate-based graft polymer, which is obtained by graft-polymerizing a vinyl cyanide compound and an aromatic vinyl compound to an acrylate-based synthetic rubber through the emulsion polymerization, and a aromatic vinyl-vinyl cyanide copolymer, which is obtained by copolymerizing a vinyl cyanide compound and an aromatic vinyl compound. At this point, a resin having desired physical properties can be obtained by adjusting the physical properties and the content of an acrylate-based synthetic rubber, an acrylate-based graft polymer, and an aromatic vinyl-vinyl cyanide copolymer, which is a matrix polymer, and by selectively further adding a reinforcing material having a specific function. The ASA resin has excellent weather resistance, light resistance, chemical resistance, heat resistance, and the like, thereby being suitable for outdoor applications which are exposed to plenty of light such as outdoor electric/electronic parts, exterior parts of vehicle, construction materials, and the like.

Otherwise, an α-methyl styrene-based matrix SAN resin is conventionally used for enhancing heat resistance of an ASA resin, an existing weather resistant resin, since outdoor applications such as vehicles necessarily require heat resistance. A copolymer of a vinyl cyanide compound and an α-methyl styrene-based compound used for ensuring heat resistance has excellent heat resistance but generates plenty of gas. Thus, processing stability is reduced, gloss deterioration is caused, and further color of the copolymer is quite yellow, so it has inferior dyeability property.

Accordingly, present inventors have developed an ASA graft copolymer having enhanced impact resistance, weather resistance, and dyeability properties by structurally changing the core design of an ASA graft copolymer having a core-shell structure in order to overcome the above-mentioned problems.

DETAILED DESCRIPTION OF THE INVENTION

Technical Subject

The objective of the present invention is to provide an ASA graft copolymer having excellent impact resistance, weather resistance, and dyeability properties.

The objective of the present invention is to provide a method for manufacturing an ASA graft copolymer having impact resistance, weather resistance, and dyeability properties.

The objectives of the present invention can be achieved by the present invention described below.

Technical Solution

In order to achieve the technical subject, the present invention provides an acrylonitrile-styrene-acrylate (ASA) graft copolymer. The ASA graft copolymer characterized by having a core-shell structure, wherein the core is a multi-core rubber polymer in which alkyl acrylate monomers are sequentially polymerized, and the shell is formed by graft-polymerizing a styrene-based monomer and an acrylonitrile-based monomer on the core.

The core has an average particle diameter of more than 1,500 Å and less than or equal to 4,500 Å, a gel content of 80 to 95% by weight, and a swelling index of 15 to 30.

The multi-core rubber polymer is preferably a triple-core rubber polymer.

In the triple-core rubber polymer, cross-linking density gradually increases in the order of a first core layer, a second core layer, and a third core layer. The second core layer can be formed by copolymerizing an alkyl acrylate monomer and a styrene-based monomer.

The particle size distribution of the triple-core rubber polymer can be unimodal, bimodal, or trimodal.

The present invention provides a method for manufacturing an ASA graft copolymer including steps of manufacturing a multi-core rubber polymer latex by sequentially polymerizing alkyl acrylate monomers; and forming a shell layer by graft-polymerizing a styrene-based monomer and an acrylonitrile-based monomer to the multi-core rubber polymer.

The multi-core rubber polymer latex is preferably triple-core rubber polymer latex.

The step of manufacturing the triple-core rubber polymer latex includes a step of manufacturing a triple-core rubber polymer by (1) forming a first core layer by introducing an alkyl acrylate monomer into a reactor, introducing an emulsifier and ion-exchanged water, stirring the introduced materials, maintaining reaction temperature from 55 to 65° C., introducing a polymerization initiator, and maintaining polymerization temperature from 70 to 75° C.; (2) forming a second core layer by introducing an alkyl acrylate monomer, a cross-linking agent, and a grafting agent; and (3) forming a third core layer by introducing an alkyl acrylate monomer, a cross-linking agent, and a grafting agent. The method further includes a step of introducing a styrene-based monomer for the second core layer.

According to the step of forming the shell layer, the shell layer of the ASA graft copolymer can be formed by introducing a redox-based catalyst mixture to the multi-core rubber polymer latex, stirring the materials for 5 to 10 minutes, and continuously introducing and polymerizing a styrene-based monomer, an acrylonitrile-based monomer, a molecular weight control agent, and a polymerization initiator at a polymerization temperature of 70 to 75° C. for 2 to 5 hours.

Effect of the Invention

The ASA graft copolymer of the present invention has excellent impact resistance, weather resistance, and dyeability properties.

OPTIMAL EMBODIMENTS OF THE INVENTION

The present invention relates to an ASA graft copolymer and a method for manufacturing the same, and relates to an ASA graft copolymer having excellent impact resistance, weather resistance, and dyeability properties and a method for manufacturing the same.

The acrylonitrile-styrene-acrylate (ASA) graft copolymer of the present invention based on a core-shell structure is characterized in that the core is a multi-core rubber polymer in which alkyl acrylate monomers are sequentially polymerized, and the shell is formed by graft-polymerizing a styrene-based monomer and an acrylonitrile-based monomer to the core.

Hereinafter, the present invention is specifically described.

Acrylate-Styrene-Acrylonitrile Graft Copolymer (g-ASA)

As the representative example of an acrylate-based graft copolymer, an acrylate-styrene-acrylonitrile (hereinafter, 'ASA') graft copolymer is obtained by grafting a monomer mixture composed of a styrene-based monomer and an acrylonitrile-based monomer to an acrylate-based rubber, and is widely known to the person skilled in the art. The ASA resin has superior weather resistance and chemical resistance compared to an ABS resin but has problems having inferior impact resistance and dyeability properties. In order to overcome the above-mentioned problems, the present inventors gradually use a cross-linking agent and a grafting agent to an alkyl acrylate monomer to make cross-linkage and thus forms a triple-core rubber polymer, wherein a first core layer, a second core layer, and a third core layer are formed, and specifically cross-linking density gradually increases in the order of the first core layer to the third core layer in the structure. Then, a styrene-based monomer and an acrylonitrile-based monomer are graft-polymerized to the triple-core rubber polymer to form the shell layer of a styrene-acrylonitrile (SAN) copolymer, thereby completing the ASA graft copolymer of the present invention.

The ASA graft copolymer of the present invention has the weight ratio of the triple-core:shell is 20:80 to 80:20.

The thermoplastic resin composition, which is compounded by the ASA graft copolymer of the present invention and the SAN copolymer at the weight ratio of 4:6, preferably has impact strength of more than or equal to 30 kgf·cm/cm (⅛" notched) measured based on the ASTM D256 and preferably has ΔE value less than or equal to 3.0 measured based on SAE J 1960.

Hereinafter, the acrylate-styrene-acrylonitrile (ASA) graft copolymer of the present invention is specifically described.

(A) Triple-Core Rubber Polymer
(a1) Acrylate Monomer

The core of the present invention is an acrylate-based rubber which is formed by polymerizing acrylate monomers. The acrylate monomers are C2 to C8 alkyl acrylate, which are methyl acrylate, ethyl acrylate, propyl acrylate, isopropyl acrylate, t-butyl acrylate, n-butyl acrylate, n-octyl acrylate, or 2-ethylhexyl acrylate. Among these, n-butyl acrylate is preferable.

Specifically, the core structure of the present invention has the structure of a triple-core rubber polymer having a first core layer, a second core layer, and a third core layer. The first core layer is an acrylate-based rubber and is formed by polymerizing only alkyl acrylate monomers without a cross-linking agent. The second core layer and the third core layer are cross-linked by gradually using an alkyl acrylate monomer, a cross-linking agent, and a grafting agent with the first core layer. The core structure is characterized in that cross-linking density gradually increases in the order of the first core layer, the second core layer, and the third core layer in the structure; and impact resistance efficiency is maximized by the gradually increased cross-linking density. It is characterized in that structure is easily deformed by external impact in the rubber structure based on the morphology of an acrylate rubber as above.

The alkyl acrylate rubber polymer having the triple-core structure preferably has an average diameter more than 1,500 Å and less than or equal to 4,500 Å, a gel content of 80 to 95% by weight, and a swelling index of 15 to 30. When the particle diameter of the alkyl acrylate rubber polymer is less than or equal to 1,500 Å, enhancement efficiency of impact strength can be reduced, when the particle diameter of the alkyl acrylate rubber polymer is more than 4,500 Å, impact strength slightly increases but the mechanical stability is reduced in the process of manufacturing graft copolymers, thus excessive amount of coagulation is generated to affect polymerization stability, and low-temperature impact resistance, fluidity, and gloss, specifically dyeability properties of a molded article can be reduced.

The second core layer can be formed by copolymerizing an alkyl acrylate monomer and a styrene-based monomer to the first core layer. Specifically, the present invention is characterized in that dyeability properties and deep color realization effects are enhanced by copolymerizing a styrene-based monomer and an alkyl acrylate in the second core layer.

The styrene-based monomer is styrene, side-chain alkyl substituted styrene such as α-ethyl styrene, and α-methyl styrene, alkyl substituted styrene such as p-methyl styrene, o-t-butyl styrene, bromo styrene, chloro styrene, trichloro styrene, and the like, and those are used alone or in combination. Among theses, preferably styrene can be used.

When styrene-acrylonitrile copolymer, which is a shell layer, is graft-copolymerized on the core, the particle size distribution of the core can be controlled by using combination of bimodal or trimodal triple-core rubber polymers having different average particle diameters in order to enhance coloring properties. As an example, different bimodal cores having an average particle diameter of 1,600 to 2,000 Å and of 2,800 to 3,500 Å are preferably used when the particle diameter of the core is bimodal.

Styrene-based monomers forming the second core layer are preferably included in 5 to 20 parts by weight based on 100 parts by weight of the entire alkyl acrylate monomers. When the content of styrene-based monomer is more than 20 parts by weight, impact resistance efficiency is reduced, when it is less than or equal to 5 parts by weight, dyeability properties are reduced, and accordingly color realization gets limited.

The alkyl acrylate rubber polymers are preferably included, based on solid contents, in the range of 30 to 100 parts by weight with respect to 100 parts by weight of the entire styrene-based monomers and acrylonitrile-based monomers which form the shell layer. When the content of the alkyl acrylate rubber polymer is less than 30 parts by weight, excessive polymerization is conducted due to the increase of graft monomers, and accordingly low temperature impact resistance and high dyeability properties are difficult to be secured and generation of coagulation can be increased. Otherwise, when the content is more than 100 parts by weight, the graft monomers are reduced, accordingly grafting rate is insufficiently secured and grafting reaction between the inside and the surface of the core is inconstantly conducted. Thus, particles are aggregated in the process of coagulation and drying, the particles are difficult to be collected in the form of powder, and surface gloss and external appearance of complete molded articles are adversely affected. Further, when the powder is stored for a long period of time, the powder can become cake and blocking can be occurred.

(B) Shell Layer (Styrene-Acrylonitrile-Based Copolymer)

In the present invention, a styrene-acrylonitrile-based copolymer, obtained by graft-copolymerizing a styrene-based monomer and an acrylonitrile-based monomer to the triple-core rubber polymer (A), forms a shell layer.

The styrene-based monomer is styrene, side chain alkyl-substituted styrene such as α-ethyl styrene and α-methyl styrene, alkyl-substituted styrene such as p-methyl styrene and o-t-butyl styrene, bromo styrene, chloro styrene, trichloro styrene, and the like, and those can be used alone or in combination. Preferably, styrene can be used.

The acrylonitrile-based monomer is acrylonitrile, methacrylonitrile, and the like, and those can be used alone or in combination. Acrylonitrile can be preferably used.

The styrene-acrylonitrile-based copolymer forms the shell layer by preferably graft-copolymerizing 25 to 35% by weight of the acrylonitrile-based monomer and 65 to 75% by weight of the styrene-based monomer.

The method for manufacturing the ASA graft copolymer of the present invention will be specifically described as below. Above stated things regarding the ASA graft copolymer is prepared by the below manufacturing method.

Method for Manufacturing the ASA Graft Copolymer

First Step—Preparing of a Triple-Core Rubber Polymer

The triple-core rubber polymer of the present invention is polymerized through a step of manufacturing a triple-core rubber polymer latex by (1) forming a first core layer by mixing 25 to 40% by weight of alkyl acrylate monomer based on 100% by weight of the entire alkyl acrylate monomer with 0.01 to 0.2 parts by weight of a molecular weight control agent based on 100 parts by weight of the entire alkyl acrylate monomer, introducing the mixture into a reactor, introducing and stirring an emulsifier and ion-exchanged water, maintaining reaction temperature from 55 to 65° C., introducing a polymerization initiator, and maintaining polymerization temperature from 70 and 75° C.; (2) forming a second core layer by introducing 25 to 40% by weight of alkyl acrylate monomer based on 100% by weight of the entire alkyl acrylate monomer, additionally introducing a cross-linking agent, a grafting agent, and/or a molecular weight control agent based on 100 parts by weight of the entire alkyl acrylate monomer, and polymerizing the product until conversion rate reaches about 95%; and (3) forming a third core layer by introducing 25 to 40% by weight of alkyl acrylate monomer based on 100% by weight of the entire alkyl acrylate monomer, additionally introducing a cross-linking agent, a grafting agent, and/or a molecular weight control agent based on 100 parts by weight of the entire alkyl acrylate monomer, and polymerizing the product until polymerization conversion rate reaches about 98%.

For one specific example of the present invention, in the first step—formation of the core layer, polymerization is completed by following the same step as the said first step (formation of the core layer) except that 5 to 20 parts by weight of a styrene-based monomer is added based on 100 parts by weight of the entire alkyl acrylate monomer.

Second Step—Formation of a Shell Layer

The ASA graft copolymer of the present invention is completed by forming the shell layer of the ASA graft copolymer by introducing a redox-based catalyst to the prepared triple-core rubber polymer latex, stirring the product for 5 to 10 minutes, continuously introducing 25 to 35% by weight of an acrylonitrile-based monomer, 65 to 75% by weight of a styrene-based monomer, a molecular weight control agent, and a polymerization initiator at polymerization temperature of 70 to 75° C. for 2 to 5 hours, and cooling to complete polymerization when polymerization conversion rate reaches 93 to 98%.

Each of components used for the first and second steps of polymerization are described as follows.

As the grafting agent, aryl methacrylate (AMA), triaryl isocyanurate (TAIC), triaryl amine (TAA), aryl maleate (AM), diaryl fumarate (DAF) or diaryl amine (DAA), and the like can be used. The content of the grafting agent is preferably included in 0.01 to 2 parts by weight based on 100 parts by weight of the entire alkyl acrylate monomer.

As the cross-linking agent, divinyl benzene, trivinyl benzene, ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylol propane trimethacrylate or trimethylol methane triacrylate, and the like can be used. The content of the cross-linking agent is preferably included in 0.01 to 2 parts by weight based on 100 parts by weight of the entire alkyl acrylate monomer.

As the polymerization initiator, acetyl chloro hexyl sulfonyl peroxide, 2,2'-azobis-2,4-dimethylvaleronitrile, 2-2'azobis-(2-amidinopropane)dihydrochloride, lauroyl peroxide, 2-2'-azobisisobutylronitrile, benzoyl peroxide, dimethyl-2, 2'-azobisisobutylonitrile, 4,4'-azobis-4-cyanovaleric acid, cumene hydroperoxide, and the like can be used. The content of the polymerization initiator is preferably included in 0.01 to 5 parts by weight based on 100 parts by weight of the entire alkyl acrylate monomer.

As the emulsifier, one for conventional emulsification polymerization methods can be used without limitation. As examples, metal salts such as potassium or sodium rosin acid, fatty acid metal such as sodium laurylate, sodium oleate, potassium oleate, or potassium stearate, sodium lauryl sulfate, and potassium rosin acid, and the like. Potassium stearate or potassium rosin acid can preferably be used alone or in combination. The emulsifier can be preferably used in 0.3 to 5 parts by weight. When the content of the emulsifier is less than 0.3 parts by weight, large amount of coagulation is generated in the rubber polymer latex, when it is more than 5 parts by weight, physical properties such as grafting rate can be hardly secured and volatile gas can be generated on the external surface of a molded article in the process of injection molding.

As the redox-based catalyst used for the graft-polymerization of the core and the shell layer, 0.0005 to 0.006 parts by weight of ferrous sulfate, 0.01 to 0.15 parts by weight of sodium pyrophosphate, 0.05 to 0.15 parts by weight of dextrose are preferably used in combination. As the polymerization initiator, 0.2 to 0.8 parts by weight of cumene hydroperoxide is preferably used.

When the polymerization initiators used for the first to third steps of the core polymerization among polymerization initiators are out of the above-mentioned condition, graft copolymer, which the present invention is targeted to, is impossible to be manufactured. When the amount of the polymerization initiator is below to the above-mentioned range, graft rate is insufficiently secured, non-reacted monomers are increased, and excessive non-grafted polymers are formed. Otherwise, when the content of the polymerization initiator is excessive, reaction speed increases to cause unstable polymerization and increase the amount of coagulation.

[Embodiments of the Present Invention]

Embodiments

Each of components used for below embodiments and comparative embodiments are as follows.

Manufacturing Embodiment 1

First Step-Formation of Core

Triple-core rubber polymer having the average diameter of 1,000 Å was manufactured by followings: (1) 30% by weight of butyl acrylate monomer based on 100% by weight of the entire butyl acrylate monomer and a molecular weight control agent (n-dodecyl mercaptan) based on 100 parts by weight of the entire butyl acrylate monomer were mixed, the mixture was introduced into a reactor, 3.3 parts by weight of emulsifier and ion-exchanged water were introduced, and temperature was raised with stirring. When the reaction temperature reached 55 to 65° C., the temperature was maintained for 10 minutes with stirring. 0.5 parts by weight of polymerization initiator was introduced to start polymerization. When reaction temperature reached 70 and 75° C. after the start of the polymerization, the internal temperature of the reactor was maintained at a temperature of 70 to 75° C. using a cooler and the reaction was continued for 10 to 20 minutes, thereby forming a first core layer; (2) 35% by weight of butyl acrylate monomer, 0.2 parts by weight of cross-linking agent (triallyl isocyanurate), grafting agent (allyl methacrylate) and molecular weight control agent were continuously introduced into the manufactured first core layer rubber polymer latex, and the product was polymerized until conversion rate reached 95%, thereby forming a second core layer; and (3) 35% by weight of butyl acrylate monomer, and 0.2 parts by weight of cross-linking agent (triallyl isocyanurate), grafting agent (allyl methacrylate) and molecular weight control agent were gradually introduced into the manufactured second core layer rubber polymer latex, and the product was polymerized until polymerization conversion rate reached 98%, thereby forming a third core layer.

Manufacturing Embodiment 2-3

A core rubber polymer was manufactured by the same manufacturing method as the manufacturing embodiment 1 except for the amount of each component as below table 1.

Manufacturing Embodiment 4-6

A core rubber polymer was manufactured by the same manufacturing method as the manufacturing embodiment 1 except that it was based on double-core and the amount of each component is shown as below table 1.

Manufacturing Embodiments 7

A core rubber polymer was manufactured by the same manufacturing method as the manufacturing embodiment 1 by followings: (1) 30% by weight of butyl acrylate based on 100% by weight of the entire butyl acrylate monomer, and 2.9 parts by weight of emulsifier and ion-exchanged water were introduced based on 100 parts by weight of the entire butyl acrylate monomer, temperature was raised with stirring. When the reaction temperature reached 55 to 65° C., the temperature was maintained for 10 minutes with stirring. 1 parts by weight of polymerization initiator was introduced to start polymerization. When reaction temperature reached 70 and 75° C. after the start of the polymerization, the internal temperature of the reactor was maintained at the temperature of 70 to 75° C. using a cooler and the reaction was continued for 10 to 20 minutes, thereby forming a first core layer; (2) 30% by weight of butyl acrylate monomer, 5 parts by weight of styrene monomer, 0.2 parts by weight of cross-linking agent and grafting agent, molecular weight control agent based on 100 parts by weight of the entire butyl acrylate monomer were continuously introduced into the manufactured first core layer rubber polymer latex, and the product was copolymerized until conversion rate reached 95%, thereby forming a second layer; and (3) 35% of butyl acrylate monomer, and additionally 0.2 parts by weight of cross-linking agent and grafting agent, and molecular weight control agent were gradually introduced into the manufactured second core layer rubber polymer latex, and the product was polymerized until polymerization conversion rate reached 98%, thereby forming a third core layer.

ASA graft copolymer latex was manufactured by introducing 0.5 parts by weight of redox-based catalyst mixture, 0.6 parts by weight of emulsifier, 0.7 parts by weight of polymerization initiator into 60 parts by weight of rubber polymer latex of the manufacturing embodiment 7, stirring the product for 5 to 10 minutes, continuously introducing 75% by weight of styrene monomer and 25% by weight of acrylonitrile monomer at the polymerization temperature of 70 to 75° C. for 2 to 5 hours, and cooling to complete the polymerization when polymerization conversion rate reached 93 to 98%.

Manufacturing Embodiments 8-9

ASA graft copolymer was manufactured by the same manufacturing method as the manufacturing embodiment 7 except for the amount of each component as below table 2.

Manufacturing Embodiments 10-12

ASA graft copolymer was manufactured by the same manufacturing method as the manufacturing embodiment 7 except that it was based on double-core and the amount of each component is shown as below table 2.

Embodiment 1

ASA graft copolymer latex was manufactured by introducing 0.5 parts by weight of a redox-based catalyst, 0.6 parts by weight of an emulsifier, and 0.7 parts by weight of a polymerization initiator into 60 parts by weight of the rubber polymer of the manufacturing embodiment 2, stirring the product for 5 to 10 minutes, continuously introducing 75% by weight of styrene monomer and 25% by weight of acrylonitrile monomer at the polymerization temperature of 70 to 75° C. for 2 to 5 hours, and forcibly cooling to terminate the polymerization when polymerization conversion rate reached 93 to 98%.

Embodiments 2-5 and Comparative Embodiments 1-8

An ASA graft copolymer latex was manufactured by the same manufacturing method as the embodiment 1 except for using components and the amount of each content as the below table 3.

Embodiments 6-10 and Comparative Embodiments 9-16

A pellet-shaped thermoplastic resin composition was obtained by compounding the ASA graft copolymer manufactured in the embodiments 1 to 5 and comparative embodiments 1 to 8 with an SAN copolymer and extruding/processing the compound. A twin-screw extruder having the diameter of 45 mm and L/D of 29 was used for the extrusion, and barrel temperature was set at 230° C. The pellet was dried at 80° C. for 2 hours, and a specimen having a size of 9 cm ×5 cm ×0.2cm was manufactured at the cylinder temperature of 240° C. and molding temperature of 60° C. using a 6 oz injection molding machine. After a specimen was manufactured, impact strength, dyeability index, and weather resistance were measured. The result value thereof is shown on the table 4.

Embodiments 11-13 and Comparative Embodiments 17-19

A specimen was manufactured by the same method disclosed in the embodiments 6-10 and the comparative embodiments 9-16 except for obtaining a pellet-shaped thermoplastic resin composition after compounding the ASA graft copolymer manufactured in the manufacturing embodiments 7 to 12 with an SAN copolymer and extruding/processing the compound. After the specimen was manufactured, impact strength, dyeability index, and weather resistance were measured. The result value thereof is shown on a table 5.

Evaluation Method of Physical Properties

Izod impact strength (notched): it was measured based on ASTM D256 standard.

Low temperature impact strength (notched, ⅛"): it was measured based on ASTM D256 standard at −30° C.

Dynamic swelling index: swelling index per time was measured at room temperature (25° C.).

Dyeability properties: L value and b value of dyeability property measurement specimen were measured using CCM (Minolta). If the L value of the specimen reduces, the specimen has low brightness and expresses dark black, and thus the specimen has superior pigment dyeability properties.

Weather resistance: it was measured according to SAE J 1960 (2,000 hr, ΔE/Δb).

TABLE 1

| | | Manufacturing embodiment | | | | | |
|---|---|---|---|---|---|---|---|
| Classification | | 1 | 2 | 3 | 4 | 5 | 6 |
| | Emulsifier (A) | 3.3 | 2.9 | 2.5 | 3.3 | 2.9 | 2.5 |
| | Initiator (B) | 0.5 | 1.0 | 1.5 | 0.5 | 1.0 | 1.5 |
| Core 1 | Acrylate-based monomer (C) | 30 | 30 | 30 | 30 | 30 | 30 |
| | Cross-linking agent and grafting agent(D) | — | — | — | 0.3 | 0.3 | 0.3 |
| Core2 | Acrylate-based monomer (C) | 35 | 35 | 35 | 70 | 70 | 70 |
| | Cross-linking agent and grafting agent(D) | 0.2 | 0.2 | 0.2 | 0.7 | 0.7 | 0.7 |
| Core3 | Acrylate-based monomer (C) | 35 | 35 | 35 | — | — | — |
| | Cross-linking agent and grafting agent(D) | 0.2 | 0.2 | 0.2 | — | — | — |
| Average diameter (Å) | | 1,000 | 2,000 | 3,000 | 1,000 | 2,000 | 3,000 |

TABLE 2

| | | Manufacturing embodiment | | | | | |
|---|---|---|---|---|---|---|---|
| Classification | | 7 | 8 | 9 | 10 | 11 | 12 |
| | Emulsifier (A) | 2.9 | 2.9 | 2.5 | 3.3 | 2.9 | 2.5 |
| | Initiator (B) | 1.0 | 0.5 | 1.5 | 0.5 | 1.0 | 1.5 |
| Core 1 | Acrylate-based monomer (C) | 30 | 30 | 30 | 20 | 5 | 10 |
| | Styrene monomer (D) | — | — | — | — | 15 | 10 |
| | Cross-linking agent and grafting agent (E) | — | — | — | — | 0.3 | 0.3 |
| Core2 | Acrylate-based monomer(C) | 30 | 25 | 20 | 80 | 80 | 80 |
| | Styrene monomer(D) | 5 | 10 | 15 | — | — | — |
| | Cross-linking agent and grafting agent(E) | 0.2 | 0.2 | 0.2 | 0.7 | 0.7 | 0.7 |
| Core3 | Acrylate-based monomer (C) | 35 | 35 | 35 | — | — | — |
| | Cross-linking agent and grafting agent(E) | 0.2 | 0.2 | 0.2 | — | — | — |
| SHELL | Styrene monomer (E) | 75 | 65 | 75 | 65 | 75 | 65 |
| | Acrylonitrile monomer (F) | 25 | 35 | 25 | 35 | 25 | 35 |
| | Refractive index | 1.5129 | 1.5137 | 1.5204 | 1.5061 | 1.5204 | 1.5137 |

TABLE 3

| | | Embodiment | | | | | Comparative embodiment | | | | | | | |
|---|---|---|---|---|---|---|---|---|---|---|---|---|---|---|
| | Classification | 1 | 2 | 3 | 4 | 5 | 1 | 2 | 3 | 4 | 5 | 6 | 7 | 8 |
| Core | Manufacturing embodiment 1 | — | — | 30 | — | 20 | 60 | 30 | — | — | — | — | — | — |
| | Manufacturing embodiment 2 | 60 | — | — | 30 | 20 | — | 30 | — | — | — | — | — | — |
| | Manufacturing embodiment 3 | — | 60 | 30 | 30 | 20 | — | — | — | — | — | — | — | — |
| | Manufacturing | — | — | — | — | — | — | — | 60 | — | — | 30 | 30 | — |

TABLE 3-continued

|  |  | Embodiment | | | | | Comparative embodiment | | | | | | | |
|---|---|---|---|---|---|---|---|---|---|---|---|---|---|
| Classification | | 1 | 2 | 3 | 4 | 5 | 1 | 2 | 3 | 4 | 5 | 6 | 7 | 8 |
| | embodiment 4 | | | | | | | | | | | | | |
| | Manufacturing embodiment 5 | — | — | — | — | — | — | — | — | 55 | — | 30 | — | 30 |
| | Manufacturing embodiment 6 | — | — | — | — | — | — | — | — | — | 50 | — | 30 | 30 |
| | Particle size distribution | 1 | 1 | 2 | 2 | 3 | 1 | 2 | 1 | 1 | 1 | 2 | 2 | 2 |
| | Average diameter (Å) | 2000 | 3000 | 2000 | 2500 | 2000 | 1000 | 1500 | 1000 | 2000 | 3000 | 2000 | 2500 | 2000 |
| | Emulsifier (A) | 0.6 | 0.6 | 0.6 | 0.6 | 0.6 | 0.6 | 0.6 | 0.6 | 0.6 | 0.6 | 0.6 | 0.6 | 0.6 |
| | Initiator (B) | 0.7 | 0.7 | 0.7 | 0.7 | 0.7 | 0.7 | 0.7 | 0.7 | 0.7 | 0.7 | 0.7 | 0.7 | 0.7 |
| Shell | Styrene monomer (E) | 75 | 65 | 65 | 75 | 65 | 65 | 75 | 65 | 75 | 65 | 75 | 65 | 65 |
| | Acrylonitrile monomer(F) | 25 | 35 | 35 | 25 | 35 | 35 | 25 | 35 | 25 | 35 | 25 | 35 | 35 |
| | Graft Gum | 90 | 88 | 90 | 88 | 92 | 92 | 92 | 90 | 88 | 92 | 90 | 88 | 90 |
| | Free SAN viscosity | 0.64 | 0.64 | 0.61 | 0.60 | 0.63 | 0.65 | 0.63 | 0.63 | 0.62 | 0.65 | 0.64 | 0.63 | 0.59 |

* Particle diameter: 1 is unimodal, 2 is bimonal, and 3 is trimodal.

TABLE 4

|  |  | Embodiment | | | | | Comparative embodiment | | | | | | | |
|---|---|---|---|---|---|---|---|---|---|---|---|---|---|
|  |  | 6 | 7 | 8 | 9 | 10 | 9 | 10 | 11 | 12 | 13 | 14 | 15 | 16 |
| Types of ASA graft copolymers (Embodiment or comparative embodiment of table 3) | | 1 | 2 | 3 | 4 | 5 | 1 | 2 | 3 | 4 | 5 | 6 | 7 | 8 |
| Compound evaluation | ASA graft copolymer | 40 | 40 | 40 | 40 | 40 | 40 | 40 | 40 | 40 | 40 | 40 | 40 | 40 |
| | SAN copolymer | 60 | 60 | 60 | 60 | 60 | 60 | 60 | 60 | 60 | 60 | 60 | 60 | 60 |
| Physical properties | Impact strength(1/8") (kgf · cm/cm, 23° C.) | 44 | 45 | 41.3 | 48 | 46 | 7.0 | 11.0 | 5.0 | 6.0 | 15.0 | 5.5 | 10.0 | 9.8 |
| | Color      L | 24.0 | 26.0 | 24.3 | 24.5 | 24.2 | 22.5 | 23.3 | 23.0 | 24.5 | 25.5 | 23.8 | 24.3 | 25.0 |
| | b | −0.50 | 0.50 | 0.15 | 0.00 | −0.07 | −0.20 | −0.35 | −0.25 | −0.70 | 0.60 | −0.48 | 0.18 | −0.05 |
| | Weather resistance (ΔE) | 2.5 | 2.4 | 2.5 | 2.5 | 2.5 | 2.5 | 2.4 | 2.7 | 2.6 | 2.7 | 2.7 | 2.7 | 2.7 |

TABLE 5

|  |  | Embodiment | | | Comparative embodiment | | |
|---|---|---|---|---|---|---|---|
|  |  | 11 | 12 | 13 | 17 | 18 | 19 |
| ASA graft copolymer | | Manufacturing embodiment 7 | Manufacturing embodiment8 | Manufacturing embodiment9 | Manufacturing embodiment10 | Manufacturing embodiment11 | Manufacturing embodiment12 |
| Compound evaluation | ASA graft copolymer | 40 | 40 | 40 | 40 | 40 | 40 |
| | SAN copolymer | 60 | 60 | 60 | 60 | 60 | 60 |
| Physical properties | Impact strength(1/8") (kgf · cm/cm, 23° C.) | 43.0 | 40.0 | 45.0 | 9.0 | 6.5 | 7.0 |
| | Low temperature impact strength(1/8") (−30° C., kgf · cm/cm) | 10.0 | 9.8 | 9.7 | 9.2 | 8.7 | 9.1 |
| | Color      L | 23.3 | 23.2 | 23.4 | 24.8 | 24.5 | 25.0 |
| | b | −1.8 | −1.9 | −2.0 | −1.1 | −1.5 | −1.8 |
| | Weather resistance(ΔE) | 2.5 | 2.5 | 2.6 | 2.7 | 2.9 | 2.8 |

The ASA graft copolymer of the embodiments 6 to 10, which is manufactured by the core rubber copolymer of the manufacturing embodiments 1 to 3 based on the particle size distribution of unimodal, bimodal, and trimodal, was compounded with SAN copolymer and the physical properties thereof were measured. As the experimental result, it is shown that the compounded product has superior weather resistance and impact strength and enhanced coloring properties compared to the comparative embodiments 9 to 16 using a double-core ASA graft copolymer.

Further, the manufacturing embodiments 7 to 9 use the ASA graft copolymer which is manufactured by graft-polymerizing styrene monomer and acrylonitrile monomer with triple-core rubber polymer, obtained by copolymerizing styrene and alkyl acrylate with the second core layer. On the other hand, the manufacturing embodiments 10 to 12 is the ASA graft copolymer which is based on a double-core and does not include a styrene in the core layer. As the experimental result, it is shown that the embodiments 11 to 13 of the present invention has superior weather resistance, impact strength, low temperature impact strength and enhanced dyeability properties compared to the comparative embodiments.

Simple modification and changes in the present invention can be easily implemented by the person skilled in the art, and it is considered that those modification and changes are included in the range of the present invention.

The invention claimed is:

1. An acrylonitrile-styrene-acrylate (ASA) graft copolymer having a core-shell structure wherein the core of the ASA graft copolymer is a triple layer-core rubber copolymer in which alkyl acrylate monomers are sequentially polymerized to form a core including a first core layer, a second core layer and a third core layer, and the shell is formed by graft-copolymerizing styrene-based monomer and acrylonitrile-based monomer with the core, wherein the particle size distribution of the triple layer-core rubber polmer is bimodal or trimodal.

2. The acrylonitrile-styrene-acrylate (ASA) graft copolymer according to claim 1, wherein the core has an average diameter of more than 1,500 Å and less than or equal to 4,500 Å, a gel content of 80 to 95% by weight, and a swelling index of 15 to 30.

3. The acrylonitrile-styrene-acrylate (ASA) graft copolymer according to claim 1, wherein the alkyl acrylate monomers are sequentially polymerized and cross-linking density increases in the order of the first core layer, the second core layer, and the third core layer for the triple layer-core rubber polymer, and a styrene-based monomer is copolymerized with an alkyl acrylate monomer in the second core layer.

4. The acrylonitrile-styrene-acrylate (ASA) graft copolymer according to claim 1, wherein the weight ratio of the triple layer core: the shell is 20:80 to 80:20.

5. The acrylonitrile-styrene-acrylate (ASA) graft copolymer according to claim 1, wherein the alkyl acrylate monomer is a C2 to C8 alkyl acrylate monomer.

6. The acrylonitrile-styrene-acrylate (ASA) graft copolymer according to claim 1, wherein the styrene-based monomer is selected from the group consisting of styrene, α-ethyl styrene, α-methyl styrene, p-methyl styrene, o-t-butyl styrene, bromo styrene, chloro styrene, trichloro styrene, and a mixtures thereof.

7. The acrylonitrile-styrene-acrylate (ASA) graft copolymer according to claim 1, wherein the acrylonitrile-based monomer is acrylonitrile, methacrylonitrile, or a mixture thereof.

8. The acrylonitrile-styrene-acrylate (ASA) graft copolymer according to claim 1, wherein the alkyl acrylate monomer is included, based on solid contents, in the range of 30 to 100 parts by weight with respect to 100 parts by weight of styrene-based monomer and acrylonitrile-based monomer which form the shell layer.

9. The acrylonitrile-styrene-acrylate (ASA) graft copolymer according to claim 1, wherein the shell is formed by graft polymerizing 25 to 35% by weight of the acrylonitrile-based monomer and 65 to 75% by weight of the styrene-based monomer, each based on 100% by weight of the acrylonitrile-based monomer and the styrene-based monomer.

10. A thermoplastic resin composition which includes an ASA graft copolymer of claim 1.

11. A molded article comprising the thermoplastic resin composition of claim 10.

12. The thermoplastic resin composition according to claim 10, wherein the thermoplastic resin composition is obtained by compounding the ASA graft copolymer and a styrene-acrylonitrile (SAN) copolymer at a weight ratio of 4:6, and wherein the impact strength of the thermoplastic resin composition is more than or equal to 30 kgf·cm/cm (⅛", notched) measured based on ASTM D256, and ΔE value thereof is less than or equal to 3.0 measured based on SAE J 1960.

13. A method for manufacturing an ASA graft copolymer comprising a step of manufacturing a triple layer-core rubber polymer latex by sequentially polymerizing alkyl acrylate monomers to from a core including a first core layer, a second core layer and a third core layer; and a step of forming a shell layer by graft-copolymerizing styrene-based monomer and acrylonitrile-based monomer with the triple layer-core rubber polymer, wherein the cross-linking density increases in the order of a first core layer, a second core layer, and the third core layer by manufacturing the triple layer-core rubber polymer latex based on the steps of (1) forming the first core layer by introducing an alkyl acrylate monomer into a reactor, introducing an emulsifier and ion-exchanged water, stirring the introduced materials, raising reaction temperature to 55 to 65° C., introducing a polymerization initiator, and maintaining polymerization temperature at a range between 70 and 75° C.; (2) forming the second core layer by additionally introducing an alkyl acrylate monomer, a cross-linking agent, and a grafting agent; and (3) forming the third core layer by additionally introducing an alkyl acrylate monomer, a cross-linking agent, and a grafting agent, wherein polymerization is performed until polymerization conversion ratio reaches 95% in the second core layer forming step, and polymerization is performed until polymerization conversion ratio reaches 98% in the third core layer forming step.

14. The method for manufacturing an ASA graft copolymer according to claim 13, wherein the method further includes a step of introducing styrene-based monomer for the second core layer.

15. The method for manufacturing an ASA graft copolymer according to claim 13, wherein the shell layer of the ASA graft copolymer is formed by introducing a redox-based catalyst mixture to the triple layer-core rubber polymer latex, stirring the product for 5 to 10 minutes, and continuously introducing and polymerizing a styrene-based monomer, an acrylonitrile-based monomer, a molecular weight control agent, and a polymerization initiator at a polymerization temperature of 70 to 75° C. for 2 to 5 hours in the step of forming the shell layer, wherein the redox-based catalyst mixture includes 0.0005 to 0.006 parts by weight of ferrous sulfate, 0.01 to 0.15 parts by weight of sodium pyrophosphate, and 0.05 to 0.15 parts by weight of dextrose.

16. The method for manufacturing an ASA graft copolymer according to claim 15, wherein the polymerization is performed until polymerization conversion ratio reaches 93 to 98% in the step of forming the shell layer.

17. The method for manufacturing an ASA graft copolymer according to claim 13, wherein 25 to 40% by weight of alkyl acrylate monomer based on 100% by weight of the entire alkyl acrylate monomer is included in each step of forming the core layer, and 0.01 to 2 parts by weight of a cross-linking agent and a grafting agent based on 100 parts by weight of the entire alkyl acrylate monomer are included, respectively, in the steps of forming the second core layer and the third core layer.

18. The method for manufacturing an ASA graft copolymer according to claim 13, wherein the shell is formed by graft polymerizing 25 to 35% by weight of the acrylonitrile-based monomer and 65 to 75% by weight of the styrene-based monomer, each based on 100% by weight of the acrylonitrile-based monomer and the styrene-based monomer.

\* \* \* \* \*